(12) United States Patent
Harvie

(10) Patent No.: US 8,757,176 B2
(45) Date of Patent: *Jun. 24, 2014

(54) HAIR ACCESSORY AND METHOD OF STYLING HAIR

(75) Inventor: Philis A. Harvie, Conifer, CO (US)

(73) Assignee: Pony-O/Riot Inc, Calgary, Alberta ( * ) Notice: Subject to any disclaimer, the term of this patent is extended or adjusted under 35 U.S.C. 154(b) by 246 days.

This patent is subject to a terminal disclaimer.

(21) Appl. No.: 12/559,445

(22) Filed: Sep. 14, 2009

(65) Prior Publication Data

US 2010/0065079 A1 Mar. 18, 2010

Related U.S. Application Data

(60) Provisional application No. 61/096,774, filed on Sep. 13, 2008.

(51) Int. Cl.
*A45D 2/18* (2006.01)
*A45D 2/20* (2006.01)

(52) U.S. Cl.
USPC .......................................... 132/246; 132/247

(58) Field of Classification Search
USPC .................. 132/246, 273, 212, 247, 253, 222
See application file for complete search history.

(56) References Cited

U.S. PATENT DOCUMENTS

| | | | | | |
|---|---|---|---|---|---|
| 1,465,216 | A | * | 8/1923 | Heathcote | 132/246 |
| 1,512,490 | A | * | 10/1924 | Scheanblum et al. | 132/246 |
| 1,558,523 | A | * | 10/1925 | West | 132/246 |
| 1,916,943 | A | * | 7/1933 | Beadle | 132/246 |
| 2,103,534 | A | * | 12/1937 | Huppert | 132/246 |
| 2,105,371 | A | * | 1/1938 | Peddle | 132/246 |
| 2,195,803 | A | * | 4/1940 | Willat | 132/207 |
| 5,303,723 | A | * | 4/1994 | Schach | 132/246 |
| 5,499,638 | A | * | 3/1996 | Ripley | 132/273 |
| 5,623,953 | A | * | 4/1997 | McDowell | 132/210 |

(Continued)

FOREIGN PATENT DOCUMENTS

KR 10-19990033456 U 8/1999

OTHER PUBLICATIONS

International Preliminary Report on Patentability (Preliminary Report), International Application No. PCT/US2009/056870, International Filing Date Sep. 14, 2009, Date of Mailing Preliminary Report Mar. 15, 2011, 1 page.
International Search Report (ISR), International Application No. PCT/US2009/056870, International Filing Date Sep. 14, 2009, Date of Mailing ISR Apr. 13, 2010, 3 pages.

(Continued)

*Primary Examiner* — Robyn Doan
(74) *Attorney, Agent, or Firm* — Thomas J. Osborne, Jr.; Thomas J. Osborne, Jr., PC

(57) ABSTRACT

The presently disclosed technology teaches a hair accessory for receiving and restraining a bundle of hair, a method of making the hair accessory, and methods of styling hair and instructing others to style hair using the hair accessory. The hair accessory comprises a pair of opposing ductile metallic members. In one implementation, the ductile metallic members are generally rectangular and each has a pair of longitudinal ends. The ductile metallic members are covered by at least one backing member. The ductile metallic members are generally configured in an opposing relationship to each other with at least one closed end. The ductile metallic members may be separated from each other along a portion of their longitudinal lengths to define an opening for receiving a bundle of hair. The opposing ductile metallic members may also be closed about the bundle of hair to secure the hair accessory within a wearer's hair.

18 Claims, 7 Drawing Sheets

(56) References Cited

U.S. PATENT DOCUMENTS

| | | |
|---|---|---|
| 5,799,672 A | 9/1998 | Hansbury |
| 5,857,469 A | 1/1999 | Sowell |
| 6,305,387 B1 * | 10/2001 | Atchison ................. 132/278 |
| 6,397,854 B1 | 6/2002 | Bailey |
| 2006/0283475 A1 * | 12/2006 | Harvie ..................... 132/273 |

OTHER PUBLICATIONS

Written Opinion (WO), International Application No. PCT/US2009/056870, International Filing Date Sep. 14, 2009, Date of Mailing WO Apr. 13, 2010, 4 pages.

* cited by examiner

HAIR ACCESSORY AND METHOD OF STYLING HAIR

CROSS-REFERENCE TO RELATED APPLICATIONS

This application claims the benefit of U.S. Provisional Application No. 61/096,774 filed Sep. 13, 2008 entitled "Hair Accessory and Method of Styling Hair," the content of which is hereby incorporated by reference in its entirety. This application is also related to U.S. Non-provisional application Ser. No. 11/157,232 filed Jun. 20, 2005 entitled "Hair Accessory and Method of Styling Hair," and U.S. Non-provisional application Ser. No. 12/033,552 filed Feb. 19, 2008, entitled "Hair Accessory and Method of Styling Hair," each of which are incorporated herein by reference in their entirety.

BACKGROUND

The presently disclosed technology relates to a hair accessory, a method of making such a hair accessory, a method of styling hair using such a hair accessory, and a method of instructing others to style hair using such a method of styling hair.

BRIEF SUMMARY

It is desirable to be able to provide a hair accessory that easily and securely maintains a wearer's hair in a decorative and/or functional configuration. In one implementation, the presently disclosed technology comprises a hair accessory for receiving and retaining a bundle of hair.

A hair accessory for receiving and restraining a bundle of hair, a method of making such a hair accessory, and methods of styling hair and instructing others to style hair using such a hair accessory are provided. The hair accessory comprises a pair of opposing thin, resilient ductile metallic members. In one implementation, for example, the ductile metallic members comprise generally rectangular ductile metallic members each having a pair of longitudinal ends. The ductile metallic members are covered by at least one thin sheet-like backing member. The ductile metallic members are generally configured in an opposing relationship to each other and are generally configured with at least one closed end. The ductile metallic members may be separated from each other along at least a portion of their longitudinal lengths to define an opening for receiving a bundle of hair. The opposing ductile metallic members may also be closed about the bundle of hair to secure the hair accessory within a wearer's hair. As described below, this hair accessory may be used to provide a number of different and new hairstyles for a wearer.

In another implementation, the presently disclosed technology comprises a method of making such a hair accessory, and further comprises methods of styling hair and instructing others to style hair using such a hair accessory.

The foregoing and other aspects, features, details, utilities, and advantages of the presently disclosed technology will be apparent from reading the following description and from reviewing the accompanying drawings.

DETAILED DESCRIPTION

Figure 1:
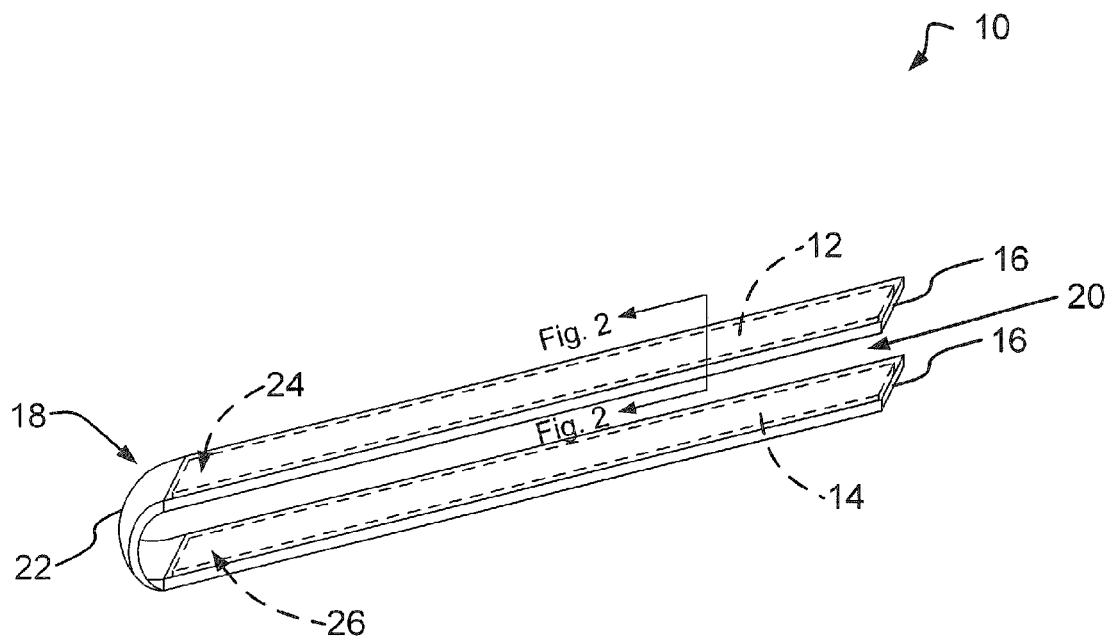
FIG. 1 is an isometric view of a hair accessory according to a first implementation of the presently disclosed technology.
Figure 2:
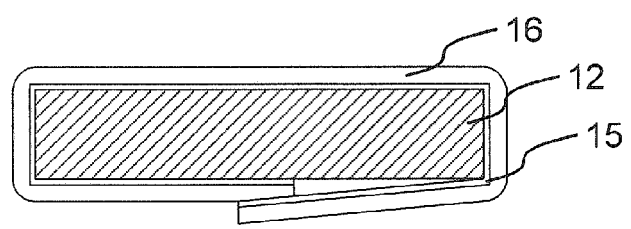
FIG. 2 is a cross-sectional view of the hair accessory of FIG. 1 taken along section line 2-2 of FIG. 1.

FIG. 1 is an isometric view of a first implementation of a hair accessory 10. FIG. 2 shows a cross-sectional view of the hair accessory 10 shown in FIG. 1 taken along section line 2-2. In this implementation, the hair accessory 10 comprises a pair of ductile metallic members 12, 14. Each of the pair of ductile metallic members 12, 14 is each wrapped in at least one backing member 16. The pair of opposing ductile metallic members is connected at least at a first end 18 of the hair accessory 10 and may be separated from each other to define an opening 20 for receiving a bundle of hair. The pair of opposing ductile metallic members 12, 14 may then be brought back together to secure the bundle of hair disposed between the opposing ductile metallic members 12, 14

In the particular implementation of FIG. 1, the hair accessory 10 comprises a pair of opposing ductile metallic members wrapped and fixedly attached within at least one backing member 16. The opposing ductile metallic members 12, 14 are generally disposed in an end-to end configuration within the at least one backing member 16. A portion 22 of the backing member 16 connects longitudinal ends 24, 26 of the pair of ductile metallic members 12, 14 at the first end 18 of the hair accessory 10. In other implementations, however, the longitudinal ends 24, 26 of the pair of ductile metallic members 12, 14 may be attached by any other method, such as a clamp, a rivet, a bolt and nut, a staple, welding, soldering, heat staking, adhesive, tape, or the like.

In this particular implementation, the ductile metallic members 12, 14 are fixedly attached within at least one backing member 16 along at least a portion of a length of the ductile metallic members 12, 14. For example, the ductile metallic members 12, 14 may be fixedly attached within the backing member 16 along substantially the entire length of the ductile metallic members 12, 14. The ductile metallic members 12, 14, for example, may be affixed within at least one backing member 16 by an adhesive or tape 15 (e.g., two-sided tape), In other implementations, the ductile metallic members 12, 14 may be affixed within at least one backing member 16 by weld, fuse, heat stake, stitch, hook and loop fastener, or the like. In this manner, movement of the affixed ductile metallic members 12, 14 with respect to the backing member 16 can be reduced and allow the hair accessory 10 to grasp a wearer's hair without slipping. In one implementation, for example, the backing member comprises a velvet or suede material, although other materials may also be used. The ductile metallic members 12, 14 may comprise any ductile metallic materials, such as copper, aluminum, or alloys of one or both.

Figure 3:
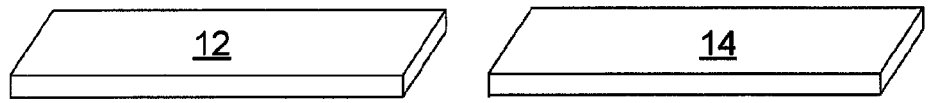
FIGS. 3-5 are isometric views depicting steps for assembling the hair accessory of FIG. 1.
Figure 4:
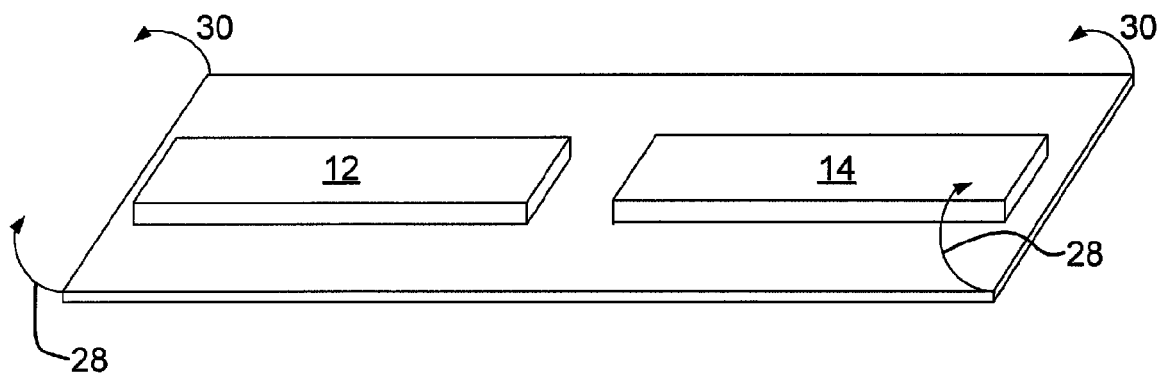
Figure 5:
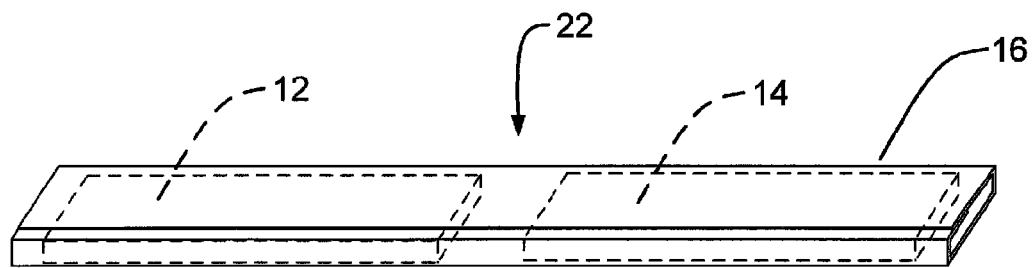

FIGS. 3 through 5 show a method for assembling the hair accessory 10 shown in FIG. 1. In FIG. 3, for example, a pair of generally rectangular ductile metallic members 12, 14 is provided disposed in a generally end-to-end configuration with a spacing between opposing longitudinal ends of the ductile metallic members 12, 14. A backing member 16 is then wrapped about the ductile metallic members 12, 14 as shown by arrows 28, 30 and is fixedly attached to the ductile metallic members 12, 14. The backing member 16, for example, may be fixedly attached to the ductile metallic members by any known attachment structure, such as adhesive, two-sided tape, weld, fuse, heat stake, stitch, hook and loop fastener, or the like. The backing member 16, for example, may comprise a material that covers the ductile metallic members 12, 14 and protects them from an external environment and/or protects a wearer from potentially sharp edges of the ductile metallic members. A soft material, such as velvet, suede, or leather, for example, may be used as the backing member 16. In other implementations, a polymer such as polyurethane may be used.

As shown in FIG. 5, a connecting portion 22 of the backing member 16 connects the longitudinal ends of the ductile metallic members 12, 14 at a first end 18 of the hair accessory 10. The generally rectangular ductile metallic members 12, 14 covered by the backing member 16, are disposed in an opposing relationship by bending the hair accessory 10 at the connecting portion 22 of the backing member 16 as shown in FIG. 1. The opposing ductile metallic members 12, 14 and the connecting portion 22 of the backing member 16 form an opening 18 for receiving a bundle of hair. The opposing ductile metallic members 12, 14 may be closed about the bundle of hair and worked into a hairstyle as described below.

Figure 6:
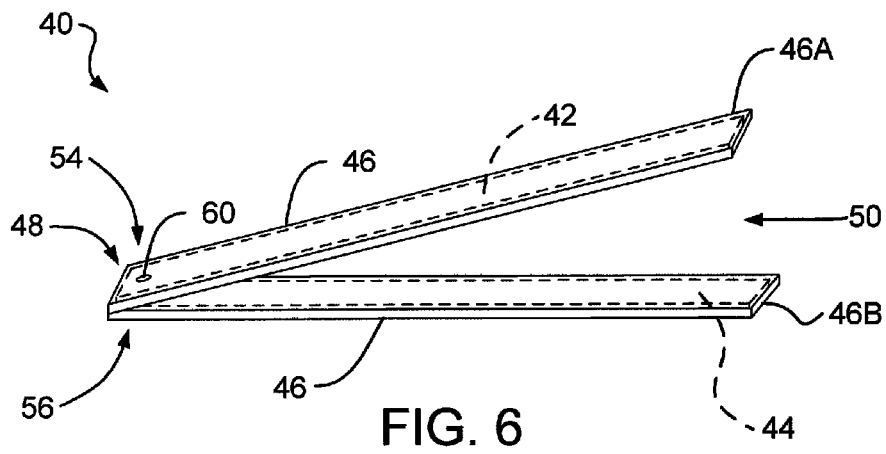
FIG. 6 is an isometric view of a hair accessory according to a second implementation of the presently disclosed technology.

FIG. 6 shows another implementation of a hair accessory 40. The hair accessory 40 again comprises a pair of opposing generally rectangular ductile metallic members 42, 44 wrapped and fixedly attached within at least one backing member 46. In this particular implementation, for example, the pair of ductile metallic members 42, 44 are individually wrapped by separate backing members 46A and 46B.

In an alternative implementation, however, the ductile metallic members may be wrapped together as described above with respect to FIGS. 1 through 6. In this alternative implementation, the backing member may be cut at the end 48 of the hair accessory or merely folded over between the pair of ductile metallic members.

The pair of opposing ductile metallic members is connected at least at a first end 48 and may be separated from each other to define an opening 50 for receiving a bundle of hair. The pair of opposing ductile metallic members 42, 44 may then be brought back together to secure the bundle of hair disposed between the opposing ductile metallic members 42, 44. In this implementation, the pair of opposing ductile metallic members 42, 44 is connected together at the first end 48 of the hair accessory 40 by an attachment means, such as a rivet 60 (e.g., a self-piercing rivet with or without a cap), a bolt and nut, a clamp, a staple, welding, soldering, heat staking, or the like.

In the particular implementation of FIG. 6, the hair accessory 40 comprises a pair of opposing ductile metallic members wrapped and fixedly attached within at least one backing member 46.

In this particular implementation, the ductile metallic members 42, 44 are fixedly attached within at least one backing member 46 along at least a portion of a length of the ductile metallic members 42, 44. For example, the ductile metallic members 42, 44 may be fixedly attached within the backing member 46 along substantially the entire length of the ductile metallic members 42, 44. The ductile metallic members 42, 44, for example, may be affixed within at least one backing member 46 by adhesive, two-sided tape, weld, fuse, heat stake, stitch, hook and loop fastener, or the like. In this manner, movement of the affixed ductile metallic members 42, 44 with respect to the backing member 46 can be reduced and allow the hair accessory 40 to grasp a wearer's hair without slipping. In one implementation, for example, the backing member comprises a velvet or suede material, although other materials may also be used. The ductile metallic members 42, 44 may comprise any ductile metallic materials, such as copper, aluminum, or alloys of one or both.

Figure 7:
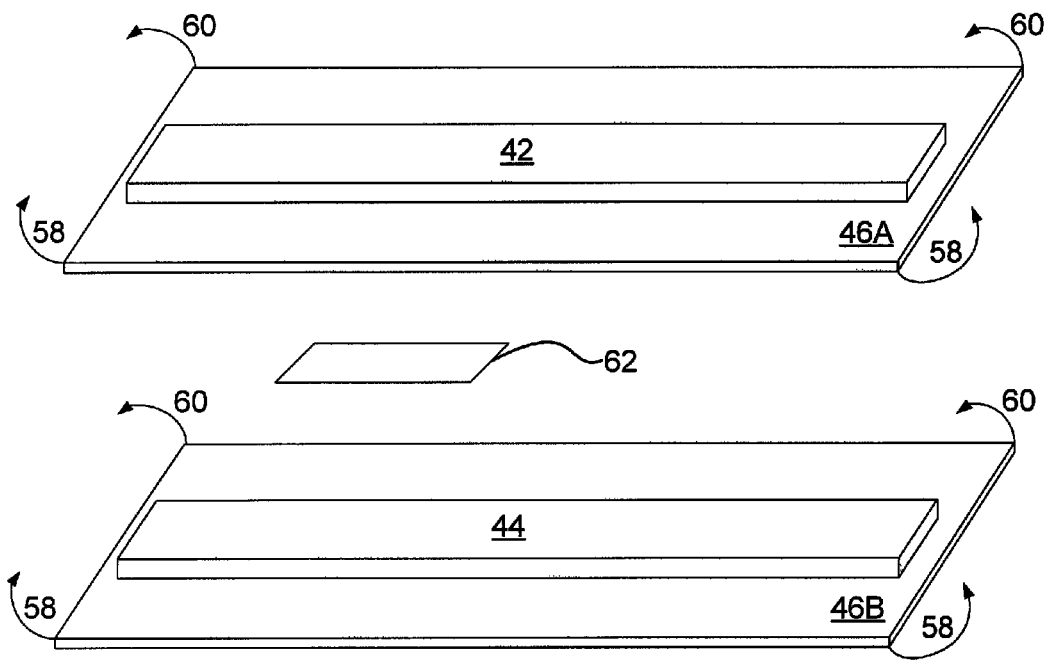
FIGS. 7 and 8 are isometric views depicting steps for assembling the hair accessory of FIG. 6.
Figure 8:
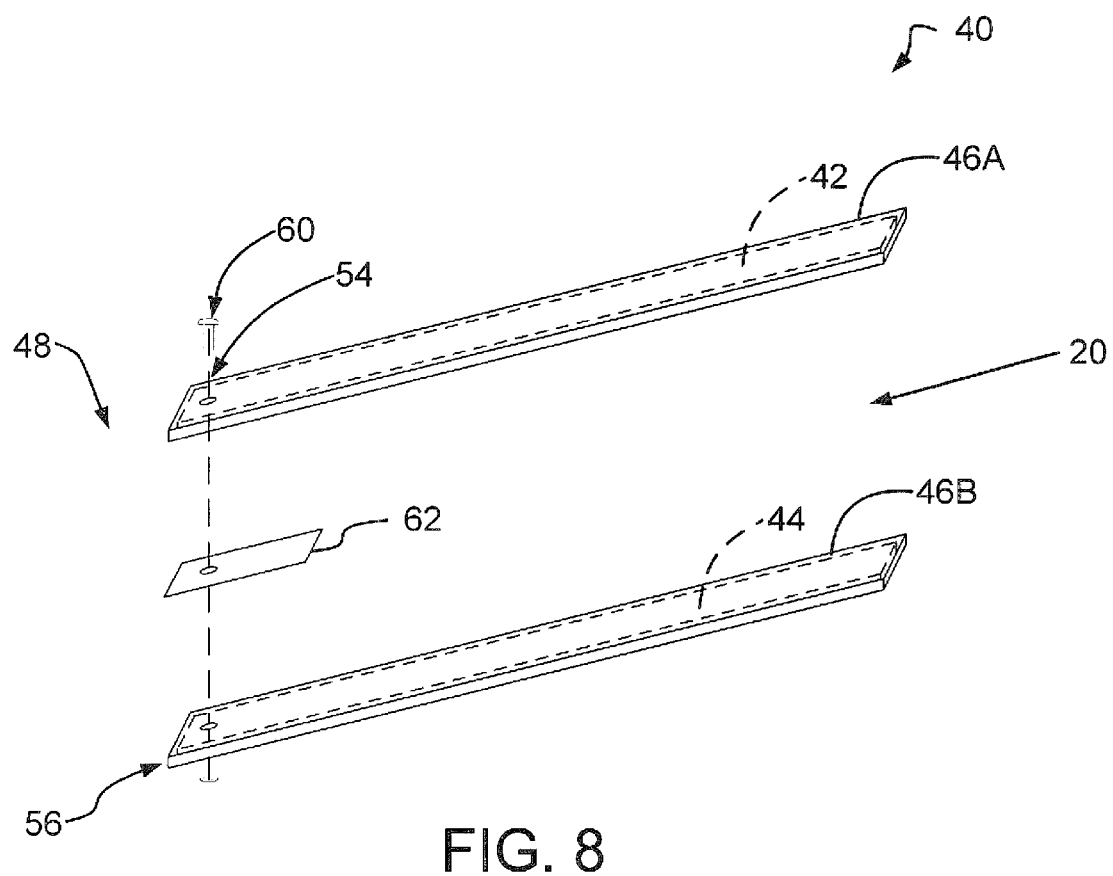

FIGS. 7 through 8 show a method for assembling the hair accessory 40 shown in FIG. 6. In FIG. 7, for example, a pair of generally rectangular ductile metallic members 42, 44 are individually wrapped as shown by arrows 58, 60 by and fixedly attached within backing members 46A and 46B. The ductile metallic members 42 44 are disposed opposing each other with longitudinal ends 54, 56 disposed adjacent to each other at a first end 48 of the hair accessory 40. In one implementation, the longitudinal ends may be secured (e.g., by an adhesive or two-sided tape 62 disposed between longitudinal ends) to prevent or reduce rotation (or sliding motion) of one ductile metallic member 42 with respect to the other ductile metallic member 44. In an alternative implementation, a second securing mechanism (e.g., a second rivet and cap) may be used to prevent or reduce rotation of one ductile metallic member 42 with respect to the other ductile metallic member 44.

Where the means for connecting the longitudinal ends 54, 56 of the ductile metallic members 42, 44 comprises an attachment mechanism that allows the overlapping longitudinal end regions to rotate relative to each other (e.g., a rivet 60 or a bolt and a nut), the means for connecting the first and second longitudinal end regions may additionally comprise a means for securing the longitudinal end regions to restrain the overlapping end regions from rotating relative to each other about the attachment mechanism. A layer of two-sided tape or adhesive 62, for example, may be disposed between the longitudinal ends of the opposing ductile metallic members to affix end regions to each other. It has been found that by restraining the longitudinal ends from rotating about this rivet or other connector, the ductile metallic member is less likely to fracture and potentially cause a failure of the hair accessory. Another possible means for securing the longitudinal ends of the opposing ductile metallic members together may comprise a piece of tape wrapped about end regions of the ductile metallic members to restrain the ductile metallic members from rotating with respect to each other. Where a rivet or other connector extends through the longitudinal ends of the opposing ductile metallic members, the piece of tape may be wrapped about the overlapping longitudinal end regions before and/or after the rivet or other attachment mechanism is inserted through the overlapping longitudinal end regions. Again, wrapping the overlapping longitudinal end regions restrains the longitudinal end regions from rotating with respect to each other about the rivet or other connector extending through the longitudinal end regions. The means for securing the longitudinal end regions may also comprise at least one of a bond, weld, fuse, stitching, or any combination thereof, otherwise securing the first longitudinal end region to the second longitudinal end region to restrain the overlapping end regions from rotating with respect to each other.

As shown in FIG. 8, the longitudinal ends 54, 56 of the wrapped ductile metallic members 42, 44 are connected by a securing structure, such as a rivet 60 (e.g., a self-piercing rivet with or without a cap), a bolt and nut, a clamp, a staple, welding, soldering, heat staking, or the like. Further, the longitudinal ends 54, 56 may also be secured (e.g., by an adhesive or two-sided tape 62 disposed between longitudinal ends) to prevent or reduce rotation (or sliding motion) of one ductile metallic member 42 with respect to the other ductile metallic member 44. The opposing ductile metallic members 42, 44 and the securing structure 60 of the backing member 46 form an opening 48 for receiving a bundle of hair. The opposing ductile metallic members 42, 44 may be closed about the bundle of hair and worked into a hairstyle as described below.

Although examples of wrapping the ductile metallic members of the hair accessories by the backing member are described above with respect to FIGS. 1 through 8, other methods of wrapping or covering the ductile metallic members may also be used. Many such methods, for example, are described in U.S. patent application Ser. Nos. 11/157,232 and 12/033,552, which are each hereby incorporated by reference in their entirety.

One particular implementation of connecting longitudinal ends of the ductile metallic members comprises the use of one or more rivet. In one particular implementation, a rivet may comprise a steel self-piercing rivet. In another implementation, a rivet may comprise a breakstem blind rivet fastener including a stem, a head, and a shank extending from the stem to the head. The head and the shank are extended through the longitudinal ends of the ductile metallic members. The end of the stem is pulled, retracting the head into the shank until the longitudinal ends of the ductile metallic members are connected, and the stem fractures and is removed from the rivet. Alternatively, the rivet may be a solid, blind, multi-grip, grooved, peel type blind, self-piercing, plastic, tubular type rivet, a multi-piece rivet with a cap, or any other type of rivet known in the art.

In example implementations, the ductile metallic members may comprise cold-rolled copper or alloys thereof comprised substantially of copper, in thicknesses between about 0.010" and about 0.070", to provide a combination of ductility and resistance to flexure for the ductile metallic member. Substantially pure cold-rolled annealed copper in thicknesses between about 0.010" and about 0.070" provide an easily manually bendable member that possesses sufficient resilience to flexure to retain a bundle of hair in a desired configuration. Other metals possessing comparable ductility and resistance to flexure may also be used. The ductile metallic member may, for example, comprise a generally rectangular piece of metal having a length from about 6.5" to about 9.25".

The backing member may comprise, for example, materials such as leather, imitation leather, suede, imitation suede, velvet, vinyl (such as polyvinyl chloride material), cotton, polyester, rayon, silk, hemp, reptile skin, imitation reptile skin, open or closed-cell neoprene, polyethylene, or polyurethane, or a combination of any of these materials. The backing member may further comprise a material resistant to flexure to prevent a portion of the backing member extending beyond the ductile metallic member from being folded or bent around the ductile metallic member. The backing member may also comprise a memory, wherein when the backing member is deformed (e.g., about the ductile metallic member), the backing member is sufficiently resilient to return the deformed portions to their original position substantially parallel or coplanar with the ductile metallic member. This aspect of one implementation of a backing member provides a flat decorative surface and, in the case where the width of the hair accessory is substantially greater in comparison to the width of the ductile metallic member, restores the flat decorative surface in the event that the hair accessory is deformed when it is placed on a wearer's hair. The backing member, however, should be insufficiently resilient to overcome the resistance to bending of the ductile metallic member.

Methods of and Instructions for Styling Hair

Referring back to FIG. 1, in one example use of the hair accessory 10, a wearer may open the hair accessory 10 by separating the ductile metallic members 12, 14 to provide an opening 20 for receiving a bundle of hair. The opening 20 of the hair accessory 10 may then be closed by moving the ductile metallic members 12, 14 toward each other and the bundle of hair disposed between the ductile metallic members 12, 14. The hair accessory 10 can then be rolled up, with the bundle of hair, toward the wearer's head. The hair accessory 10 can then be folded over itself to form a circle that secures it in the wearer's hair and forms the wearer's hair into a donut. The wearer's hair can also be fanned out over the hair accessory to improve uniformity of the donut.

Figure 9:
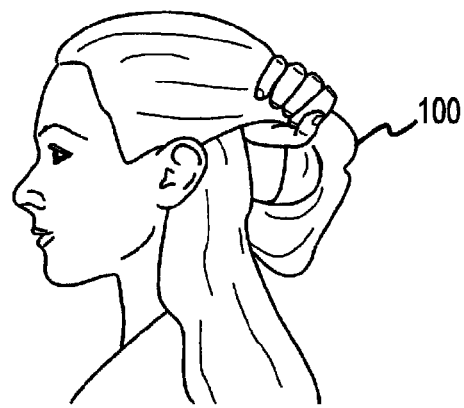
FIGS. 9-14 are isometric views depicting steps for a method of styling hair according to the presently disclosed technology.

FIGS. 9-14 show steps of a method for styling hair into a donut using a hair accessory 102 according to the presently disclosed technology and a corresponding method of instruction for showing a wearer how to style hair according to the disclosed method. As shown in FIG. 9, a wearer's hair is gathered into a bundle 100 for forming the donut. The bundle 100 may comprise an upper portion (as shown in FIG. 9), a lower portion, or substantially all of the wearer's hair. Further, multiple bundles of hair may be gathered for forming multiple donuts. The hair accessory 102 has opposing ductile metallic members that may be separated from each other along at least a portion of their longitudinal lengths to define an opening 104 for receiving the bundle of hair 100.

Figure 10:
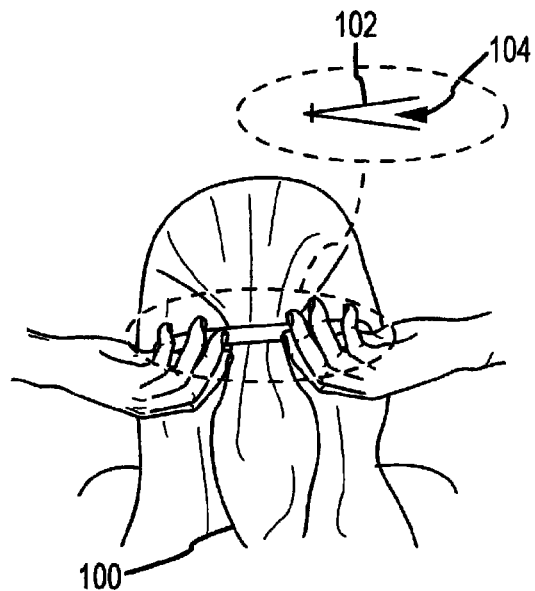
Figure 11:
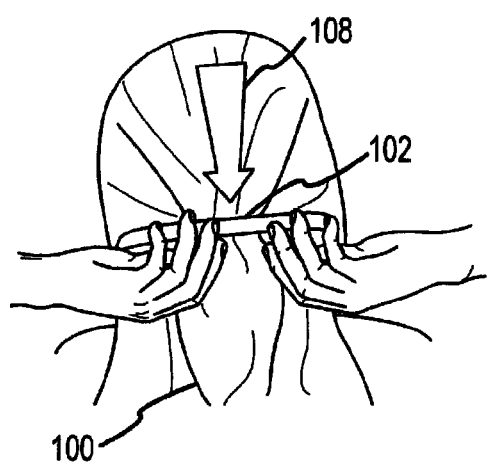
Figure 12A:
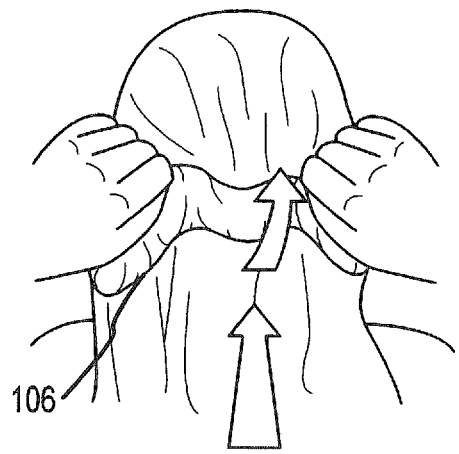
Figure 12B:
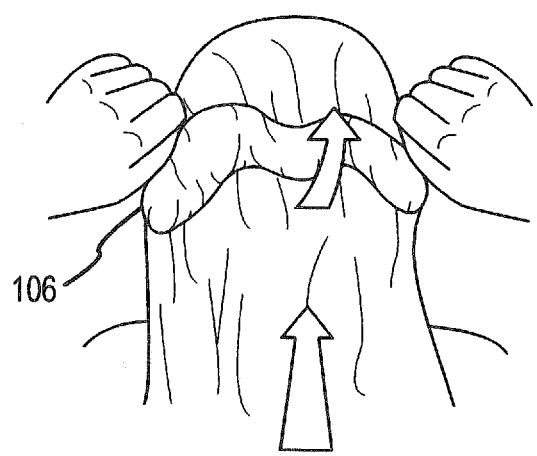

The bundle of hair 100 is inserted or slid in the opening 104 of the hair accessory 102 as the hair accessory 102 is held close to the wearer's head, as shown in FIG. 10. The wearer then slides the hair accessory 102 downward to a desired position along a length of the bundle 100 as illustrated by arrow 108 in FIG. 11. After positioning the hair accessory 102 at the desired position, the wearer may fan her hair out so that it is evenly distributed through the opening 104 of the hair accessory 102. The opening 104 may then be closed around the bundle of hair 100 by moving the ductile metallic members toward each other. Once the wearer is satisfied with the position of the hair accessory 102 and the distribution of the bundle of hair 100 within the opening 104, she may roll the hair accessory 102 upward toward her head as illustrated in FIGS. 12A and 12B. The wearer's hair wraps around the hair accessory 102 forming a roll 106, at least partially obscuring the hair accessory 102.

If before rolling the hair accessory 102 the desired position of the hair accessory 102 is closer to a free end of the bundle 100 rather than a root of the bundle 100 at the wearer's head, then substantially all of the bundle 100 will be contained within the roll 106 of the hair accessory 102, as shown in FIG. 12A. This is referred to herein as a classic donut. However, if the wearer desires a portion of the bundle 100 to extend out of the roll 106, for instance as a style variation, she may select a desired position of the hair accessory 102 closer to the root of the bundle 100 at the wearer's head than the free end of the bundle 100. When the bundle 100 is rolled up, a portion of the free end of the bundle 100 extends outward from the roll 106 as illustrated in FIG. 12B. This is referred to herein as a funky donut.

Figure 13:
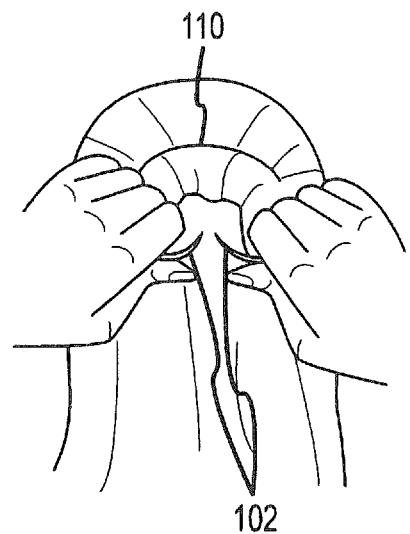
Figure 14:
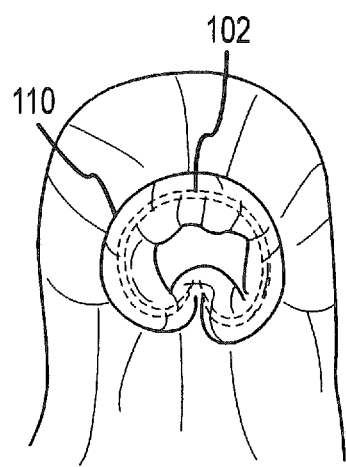

Regardless of whether the roll 106 takes the form depicted in FIG. 12A or FIG. 12B, in order to form the roll 106 into a donut 110, the wearer grasps the ends of the hair accessory 102 within the roll 106 and bends the ends downward and together to form a generally round shape as shown in FIG. 13. In other implementations, the roll may be bent in other shapes (e.g., a square, triangle, and oval) to form the donut 110. Still further, the wearer may alternatively bend the ends of the hair accessory 102 upward to form the donut 110. When the wearer is satisfied with the shape of the hair accessory 102 forming the donut 110, the wearer may re-distribute her hair around the hair accessory 102 to provide a uniform appearance of the donut 110 and obscure hair accessory 102 to provide the appearance of a continuously formed donut 110, as illustrated in FIG. 14.

Although several implementations of example hair accessories and methods for styling hair and instructing others to style hair using such a hair accessory have been described above with a certain degree of particularity, those skilled in the art could make numerous alterations to the disclosed implementations without departing from the spirit or scope of this invention. In addition, certain features are described in various implementations for ease of understanding. These features may be interchanged with features of other implementations or may be added to other implementations. All directional references (e.g., upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention.

What is claimed:

1. A hair accessory comprising:
a pair of generally rectangular ductile metallic members, each having a major dimension face corresponding to a width of the ductile metallic member and a minor dimension face corresponding to a thickness of the ductile metallic member, the width of the major dimension face being greater than the thickness of the minor dimension face, the pair of generally rectangular ductile metallic members generally opposing each other along the major dimension faces and disposed within at least one backing member, wherein the ductile metallic members are fixedly attached within the at least one backing member along substantially the entire length of the ductile metallic member, each of the pair of generally rectangular ductile metallic members comprising a proximal longitudinal end and a distal longitudinal end, the pair of generally rectangular ductile metallic members generally disposed in an end-to-end configuration in which the proximal longitudinal ends of the pair of generally rectangular ductile metallic members are disposed adjacent each other and secured to each other via a rivet such that the major dimension faces of each ductile metallic member are aligned with each other at the proximal longitudinal ends, and distal longitudinal ends of each of the pair of generally rectangular ductile metallic members being free from each other, wherein distal ends of the pair of generally rectangular ductile metallic members are configured to be separated from each other to define an opening between the pair of generally rectangular ductile metallic members for receiving a bundle of hair, wherein the alignment of the ductile metallic members at the proximal ends and fixation via the rivet reduces rotation of the pair of ductile metallic members with respect to each other and maintain the pair of ductile metallic members in alignment, wherein the pair of ductile metallic members are configured to be folded over themselves by bending the ends together to form a generally round shape to secure the accessory in a wearer's hair and allow the hair to be fanned over the hair accessory between the pair of ductile metallic members to the unattached distal longitudinal ends to obscure the hair accessory, and wherein at least one of the group comprising a tape, an adhesive and a second rivet secure the proximal longitudinal ends of the pair of ductile members to reduce rotation of the pair of ductile metallic members with respect to each other.

2. The hair accessory of claim 1, wherein the pair of adjacent proximal longitudinal ends of the generally rectangular ductile metallic members are attached to each other using the at least one backing member.

3. The hair accessory of claim 1, wherein the attached pair of adjacent proximal longitudinal ends are further secured to restrain the attached pair of adjacent longitudinal ends from rotating with respect to each other.

4. The hair accessory of claim 1, wherein the backing member comprises a longitudinal flap.

5. The hair accessory of claim 1, wherein the backing member is wrapped around the ductile metallic members.

6. The hair accessory of claim 1, further comprising a means for connecting a pair of adjacent longitudinal ends of the ductile metallic members together.

7. The hair accessory of claim 1, wherein the ductile metallic members include copper.

8. The hair accessory of claim 1, wherein the pair of ductile metallic members are configured to be folded over themselves to form a generally round shape to secure the accessory in a wearer's hair and allow the hair to be fanned over the hair accessory to at least partially obscure the hair accessory.

9. A method of instructing a user to style hair comprising:
providing instruction for creating a bundle of hair;
providing instruction for feeding the bundle of hair through an opening of a hair accessory defined by a pair of generally rectangular ductile metallic members generally opposing each other and disposed within at least one backing member, wherein the ductile metallic members are fixedly attached within the at least one backing member along substantially the entire length of the ductile metallic member, each of the pair of generally rectangular ductile metallic members comprising a proximal longitudinal end and a distal longitudinal end, the pair of generally rectangular ductile metallic members generally disposed in an end-to-end configuration in which the proximal longitudinal ends of the pair of generally rectangular ductile metallic members are disposed adjacent each other and attached to each other, and distal longitudinal ends of each of the pair of generally rectangular ductile metallic members being free from each other, wherein distal ends of the pair of generally rectangular ductile metallic members are configured to be separated from each other to define the opening between the pair of generally rectangular ductile metallic members for receiving the bundle of hair, and wherein at least one of the group comprising a tape, an adhesive and a second rivet secure the proximal longitudinal ends of the pair of ductile members to reduce rotation of the pair of ductile metallic members with respect to each other;
providing instruction for closing the bundle of hair within the hair accessory by moving the pair of ductile metallic members toward each other;

providing instruction for sliding the hair accessory downward along a length of the hair away from a wearer's head;

providing instruction for rolling the bundle of hair onto the hair accessory by rolling the hair accessory toward the wearer's head;

providing instruction for folding the pair of ductile metallic members over themselves by bending ends of the hair accessory together to form a generally round shape and secure the hair accessory in a wearer's hair; and providing instruction for fanning the hair over the hair accessory between the pair of ductile metallic members to the unattached distal longitudinal ends to obscure the hair accessory within the hair.

10. The method of claim 9, further comprising: providing instruction for positioning the hair accessory along a length of the bundle of hair.

11. The method of claim 10, wherein positioning the hair accessory closer to a free end of the bundle of hair rather than a root of the bundle of hair results in a classic donut hairstyle.

12. The method of claim 10, wherein positioning the hair accessory closer to a root of the bundle of hair rather than a free end of the bundle of hair results in a funky donut hairstyle.

13. The method of claim 9, further comprising: providing instruction for fanning the bundle of hair out across the opening of the hair accessory.

14. The method of claim 9, further comprising: providing instruction for closing the opening on the bundle of hair by moving the ductile metallic members toward each other.

15. The method of claim 9, wherein the ends of the hair accessory are bent toward each other to form a generally circular shape.

16. The method of claim 9, wherein the bundle of hair includes an upper portion of a wearer's hair.

17. The method of claim 9, wherein the bundle of hair includes substantially all of a wearer's hair.

18. A method of using a hair accessory comprising:
creating a bundle of hair;
feeding the bundle of hair through an opening of the hair accessory defined by a pair of generally rectangular ductile metallic members generally opposing each other and disposed within at least one backing member, wherein the ductile metallic members are fixedly attached within the at least one backing member along substantially the entire length of the ductile metallic member, each of the pair of generally rectangular ductile metallic members comprising a proximal longitudinal end and a distal longitudinal end, the pair of generally rectangular ductile metallic members generally disposed in an end-to-end configuration in which the proximal longitudinal ends of the pair of generally rectangular ductile metallic members are disposed adjacent each other and attached to each other, and distal longitudinal ends of each of the pair of generally rectangular ductile metallic members being free from each other, wherein distal ends of the pair of generally rectangular ductile metallic members are configured to be separated from each other to define the opening between the pair of generally rectangular ductile metallic members for receiving the bundle of hair, and wherein at least one of the group comprising a tape, an adhesive and a second rivet secure the proximal longitudinal ends of the pair of ductile members to reduce rotation of the pair of ductile metallic members with respect to each other;

closing the bundle of hair within the hair accessory by moving the pair of ductile metallic members toward each other;

sliding the hair accessory downward along a length of the hair away from a wearer's head;

rolling the bundle of hair onto the hair accessory by rolling the hair accessory toward the wearer's head;

folding the pair of ductile metallic members over themselves by bending ends of the hair accessory together to form a generally round shape and secure the hair accessory in a wearer's hair; and fanning the hair over the hair accessory between the pair of ductile metallic members to the unattached distal longitudinal ends to obscure the hair accessory within the hair.

* * * * *